United States Patent [19]

Dewaegheneire

[11] 4,448,147
[45] May 15, 1984

[54] TEMPERATURE RESPONSIVE WARNING DEVICE

[75] Inventor: Gabriël Dewaegheneire, Deerlijk, Belgium

[73] Assignee: Leuven Research & Development, Leuven, Belgium

[21] Appl. No.: 271,173

[22] Filed: Jun. 8, 1981

[30] Foreign Application Priority Data

Jun. 9, 1980 [NL] Netherlands ............... 8003358

[51] Int. Cl.³ .................. G01K 1/16; G01K 5/70
[52] U.S. Cl. ........................... 116/216; 60/527; 204/1 T; 204/194
[58] Field of Search .............. 73/363.7, 362.3; 116/216; 337/139, 140; 60/527; 374/206, 207

[56] References Cited

U.S. PATENT DOCUMENTS

| 2,640,129 | 5/1953 | Starbird | 73/362.3 X |
|---|---|---|---|
| 3,194,927 | 7/1965 | Place | 73/362.3 X |
| 3,440,997 | 4/1968 | Rogen et al. | 116/216 |
| 3,594,674 | 7/1971 | Willson | 337/139 |
| 3,832,662 | 8/1974 | Haven et al. | 340/594 X |
| 4,191,053 | 3/1980 | Hart et al. | 73/363.1 |
| 4,220,300 | 9/1980 | Reicher et al. | 116/217 |
| 4,325,217 | 4/1982 | Golestaneh | 60/527 |

FOREIGN PATENT DOCUMENTS

| 2320538 | 4/1977 | France | 374/205 |
|---|---|---|---|
| 2023818 | 3/1980 | United Kingdom | 374/206 |

Primary Examiner—Daniel M. Yasich
Attorney, Agent, or Firm—Cushman, Darby & Cushman

[57] ABSTRACT

A warning device for indicating a predetermined temperature level of a solid object includes inner and outer concentric telescoping tubes having outer surfaces of different and contrasting appearances; a heat-conducting device for fixing one of the tubes to the solid object; a temperature-responsive spring element disposed within and abutting each of the tubes, the spring element being made of a material having shape memory properties such that upon an increase in temperature it expands and causes outward telescopic movement of one tube relative to the other tube to thereby expose the outer surface of the inner tube to view.

10 Claims, 1 Drawing Figure

TEMPERATURE RESPONSIVE WARNING DEVICE

This invention relates to a warning device to signal the passing of a predetermined temperature level in the environment thereof, comprising heat-conducting fixing means and a cylindrical first tube, a spring element with shape memory effect and a covering second tube.

BACKGROUND

This device can be used to monitor the temperature of cooling circuits or of liquid baths in industrial processes.

In electrolysis cells, used for producing or recouping metals such as Cu, Zn, Ni and other non-ferro metals there often occurs an irregular, nodule shaped growth on the cathodes, leading to short circuiting in the device. A short circuit results in very high currents with a loss of efficiency, temperature rise of the contact rods and the electrolyte, the deposition of impurities on the cathode and the escape of poisonous elements such as arsenic, while a high temperature brings about an increased danger of fire of the isolation material and the ventilation devices. It is therefore of the utmost importance to signal short circuited electrodes as quickly as possible. In practice in plants having a great number of electrodes, some 10 to 15% of them show some sort of short circuiting each week.

To limit the risk of serious short circuits it is known to monitor the temperature continuously at a distance; e.g. infrared temperature monitoring is very useful.

Such a system, however, is very costly and the results are evaluated by a central unit and must be analysed to localize the position of faults. When for some reason the central unit of this system fails or is not working correctly a whole production unit will be unmonitored.

SUMMARY OF THE INVENTION

The device according to the invention is most sure, does not need an internal or external power source, comprises only a very limited number of parts, reacts quickly at certain and predetermined temperatures and can be placed individually and permanently on the electrode plates. Preferably the device is placed on the anodes with the longest standing time and on that part of the suspension which as the smallest cross-section and is therefore heated quickly when a high current flows therethrough. The supervising personal in the electrolysis hall can monitor from their normal place and a distance of several meters the situation and can immediately act accordingly, should a fault occur.

The device according to the invention comprises mutually interconnected fixed means and a first tube which quickly accumulate heat from their environment. The first tube comprises a spring element with the so-called 'shape memory effect' which changes, when its temperature passes a certain level, from one shape to another. The first tube is covered by a sliding concentric, telescoping second tube. The protruding position thereof acts as a signal for the environment. This signal can be a visual signal by means of contrasting colours on the first and the second tube respectively. For the environment this acts as a signal that a certain temperature level, signification for the characteristics of the device, is passed. A locking system prevents the second tube from becoming loose. The fixing means and the first tube are preferably made from a metal with good heat conducting properties, e.g. copper or aluminum, and must be resistant against the environment in which they are used.

The invention furthermore provides a method for signalling the surpassing of a temperature level by means of a device as described above in which the spring element, by its change of shape when a certain temperature is surpassed, acts upon the closed second tube, so that a surface with contrasting colour becomes visible. Said second tube preferably moves over the first tube.

Preferably this device is placed upon the suspending rod of an electrode in the electrolysis device. It is possible for the device to also actuate a second alarm system.

The invention will be elucidated on the hand of the accompanying drawing.

FIG. 1 is a cross-sectional view of a temperature responsive warning device embodying the principles of the present invention.

DETAILED DESCRIPTION OF THE INVENTION

Figure 1:
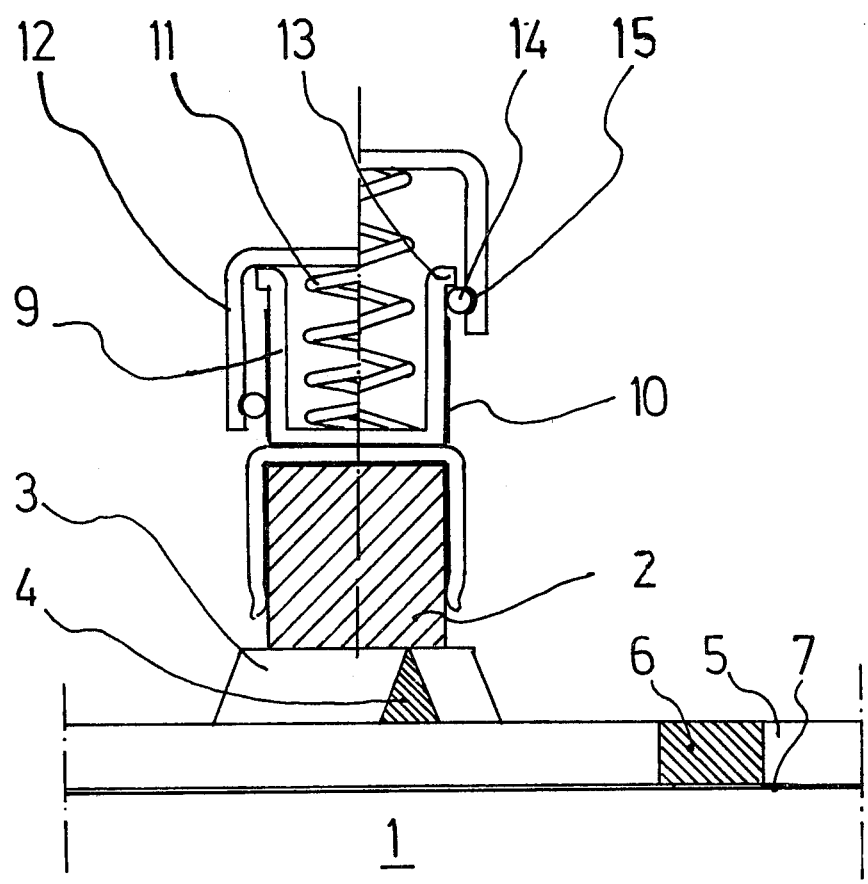

The left half of the figure is a cross-section of the parts as they are at low temperature, the right half shows the position at a high temperature. Anodes and cathodes are suspended mutually parallel in the electrolysis bath, hanging from the edge 1 thereof by means of the rods 2. These rods conduct current supplied by the power source. They rest upon contact pieces 3 having a triangular cross-section 4 which in turn take the current from the longitudinal conductors 5 with a square cross-section 6. The layer 7 is an insulation on the edge 1.

The warning device is fixed upon the rod 2 by means of an U-shaped clamp 8 from plate material. A first tube 9 is covered on the outer surface with a fluorescing contrasting colour or tape 10 and accomodates the helical coil 11 made from wire having 'shape memory effect' properties.

The telescoping second tube 12 is e.g. made from black plastics and rests normally with its upper part upon the rim 13 of the tube 9. A locking element 14, made from an open wire spring, fits into the internal groove 15 of the tube 12 so that a mechanical abutment is formed against the seating 13 and the second tube remains clamped on the first one when the spring 11 extends.

The helical spring 11 is e.g. made from a copper alloy with nominally 70% Cu - 4.2% Al and 25.6% Zn, the balance being the normal impurities. With 'nominal percentage' is meant that deviations from the given composition are in tenths of percents. The response temperature in the tensioned shape is:

$A_s$ 42±5° C.
$A_f$ 60±5° C.
$M_s$ 31±5° C.
$M_f$ 4±5° C.

The spring is made from wire having a diameter of 1.5 mm, comprises 18 windings with a diameter of 10 mm and has a total height of 30 mm at room temperature. When the temperature increases the spring will extend to a height of 73 mm between 48° C. and 70° C. This extension is limited by abutment against the seating 13.

The regeneration occurs during cooling to the temperature of below 35° C.

A number of alternative embodiments are possible. The response temperature can be changed by applying a bias; this is e.g. possible by ballasting the tube 12 to a greater weight or by using a normal tension spring between the tube 12 and the tube 9 concentrically with the spring 11.

The colour of the second tube 12 and the first tube 9 can be interchanged if the tube 12 is dimensioned to fit internally into the first tube 9. As a protection against corrosion the tube 9 can be filled with a protecting oil or paste.

A secondary warning system can be actuated simultaneously by the second tube 12 e.g. to actuate by means of a normal switch a visual or acoustic signalling device. Preferably, however, one will not use too complicated elements to prevent time consuming manipulation when the electrodes are removed. Every device from an aligned row of similar devices can e.g. also interrupt a light ray acting upon a photo switch.

The spring with the shape memory effect need not necessarily move the second tube in a telescoping way, is not limited to the described shape and can be made from a great number of different alloys having shape memory effect. The temperature range in which it works can be adapted to the installation which is to be monitored.

Similar devices can also be used to indicate that a certain minimum temperature level is not reached, dependent upon the way of use. Then another alloy will be used, either or not in combination with a bias.

Although a relatively great temperature range below the crystallisation level is covered by these alloys, e.g. a range of between -100° C. and 150° C., the use thereof is particularly advantageous at a critical temperature change around the room temperature.

I claim:

1. A warning device in heat conducting contact with a current conductor comprising means fixing the device to the conductor, at least two concentric tubular members in telescoping relationship with each other and having outer surfaces with different and contrasting appearances, a spring element with shape memory properties that is activated at a predetermined temperature, opposite sides of the spring element being in contact with inner surfaces of each tubular member whereby one of the tubular members will extend relative to the other to signal when said predetermined temperature has been reached.

2. A warning device as described in claim 1, in which the current conductor is the suspension bar of an electrode in an electrolysis cell.

3. A warning device as described in claim 1, in which the spring element is a spirally wound wire located in the interior of the tubular members.

4. A warning device as described in claim 1, in which said spring element is made of a CuZnAl alloy.

5. A warning device as described in claim 1, in which at least one of the tubular members has a closed end.

6. A method for monitoring a temperature rise of current conductors which comprises connecting a warning device with at least two concentric tubular members in telescoping relation and in heat conducting contact to a current conductor, introducing a spring element with shape memory properties in connecting abutment at the inner sides of the two tubular members so that said tubular members telescopically move during the transgression of a predetermined temperature span, and said tubular members remain connected to each other and impart a contrasting appearance to an outer surface of at least one of said tubular members so that this surface becomes visible after actuating said spring element to extend the tubular members relative to each other during said transgression of a predetermined temperature span.

7. A method as described in claim 6, in which the current conductor is an electrode suspension rod of an electrolysis cell.

8. A method as described in claim 6, in which the spring element is made of a shape memory alloy with a repeatable and regenerative shape change.

9. A warning device for indicating a predetermined temperature level of a solid object comprising inner and outer concentric telescoping tubes having outer surfaces of different and contrasting appearances; heat-conducting means for fixing one of the tubes to the solid object; a temperature-responsive spring element disposed within and abutting each of said tubes, said spring element being made of a material having shape memory properties such that upon an increase in temperature it expands and causes outward telescopic movement of one tube relative to the other tube to thereby expose the outer surface of the inner tube to view.

10. A warning device as in claim 9 in thermal contact with an electrical current conductor.

* * * * *